United States Patent
Beesley et al.

(10) Patent No.: US 7,447,149 B1
(45) Date of Patent: Nov. 4, 2008

(54) VIRTUAL INTERFACE WITH ACTIVE AND BACKUP PHYSICAL INTERFACES

(75) Inventors: Michael J. Beesley, Hillsborough, CA (US); Kireeti Kompella, Los Altos, CA (US); Ramalingam K. Anand, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 715 days.

(21) Appl. No.: 10/952,457

(22) Filed: Sep. 28, 2004

Related U.S. Application Data

(60) Provisional application No. 60/587,368, filed on Jul. 13, 2004.

(51) Int. Cl.
*G01R 31/08* (2006.01)
(52) U.S. Cl. ................................. 370/217; 370/225
(58) Field of Classification Search ............. None
See application file for complete search history.

(56) References Cited

U.S. PATENT DOCUMENTS

| | | | |
|---|---|---|---|
| 6,359,858 B1 * | 3/2002 | Smith et al. ............ | 370/217 |
| 6,549,519 B1 * | 4/2003 | Daines et al. ........... | 370/238 |
| 6,906,998 B1 * | 6/2005 | Mujeeb et al. .......... | 370/218 |
| 6,999,468 B2 * | 2/2006 | Lund et al. ............. | 370/458 |
| 7,016,379 B2 * | 3/2006 | Falkenstein et al. ..... | 370/535 |
| 7,184,437 B1 * | 2/2007 | Cole et al. ............. | 370/392 |
| 2003/0235152 A1 * | 12/2003 | Shibasaki .............. | 370/225 |
| 2004/0078625 A1 * | 4/2004 | Rampuria et al. ....... | 714/4 |
| 2005/0276215 A1 * | 12/2005 | Kitani et al. .......... | 370/217 |

OTHER PUBLICATIONS

U.S. Appl. No. 10/045,717, entitled "Network Routing Using Indirect Next Hop Data," filed Oct. 19, 2001.
U.S. Appl. No. 10/197,922, entitled "Scalable Route Resolution," filed Jul. 17, 2002.

* cited by examiner

*Primary Examiner*—Chau Nguyen
*Assistant Examiner*—Hicham B Foud
(74) *Attorney, Agent, or Firm*—Shumaker & Sieffert, P.A.

(57) ABSTRACT

A network device, such as a router, utilizes a virtual interface to hide the presence of redundant backup physical interfaces from a router control unit. If traffic needs to be redirected from a primary physical interface, the router remaps the virtual interface to the backup physical interface without needing to update routes and select one or more alternative routes due to the need to redirect traffic. Instead, the router control unit redirects network traffic associated with the primary physical interface to the associated backup physical interface. In this manner, delays associated with route updating can be avoided, and a relatively seamless switchover can be achieved from the primary to the backup physical interface.

28 Claims, 7 Drawing Sheets

VIRTUAL INTERFACE WITH ACTIVE AND BACKUP PHYSICAL INTERFACES

This application claims priority from U.S. provisional application Ser. No. 60/587,368, filed Jul. 13, 2004, the entire content of which is incorporated herein by reference.

TECHNICAL FIELD

The invention relates to computing and, more particularly, to techniques for implementing interfaces.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Routers refer to network devices whose primary function is to route packets through the network from the source device to the destination device. Routers are distributed throughout the network, and each router typically maintains routing information that describes available routes through the network. A "route" can be generally defined as a path between two locations on the network. Upon receiving an incoming packet, the router examines information within the packet that indicates the packet's destination, and forwards the packet toward its destination in accordance with the routing information maintained in the router. Available routes within the network may change, however, as network events occur, such as the failure of an existing router or the addition of a new router in the network.

In order to maintain an accurate representation of the network, routers periodically exchange routing information in accordance with a defined protocol, such as the Border Gateway Protocol (BGP). Large computer networks, such as the Internet, often include many routers grouped into administrative domains called "autonomous systems." When routers of different autonomous systems use BGP to exchange information, the protocol is referred to as External BGP (EBGP). When routers within an autonomous system use BGP to exchange routing information, the protocol is referred to as Internal BGP (IBGP). Another exemplary protocol for exchanging routing information is the Intermediate System to Intermediate System protocol (ISIS), which is an interior gateway routing protocol used by internet protocol (IP)-based networks for communicating link-state information within an autonomous system. Other examples of interior gateway routing protocols include the Open Shortest Path First (OSPF), and the Routing Information Protocol (RIP).

Routers periodically communicate with other routers in order to exchange information indicative of the ever-evolving network topology. When routers initially establish communication, the routers may exchange all of their routing information and update their respective stored information based on the routing information received from other routers. Also, after establishing communication, the routers may send control messages to incrementally update the routing information when the network topology changes. For example, the routers may send update messages to advertise newly available routes, or to withdraw routes that are no longer available.

The routing information is typically maintained in the routers in the form of one or more routing tables or other data structures. The form and contents of the routing tables often depend on the routing algorithm implemented by the router. Furthermore, some routers generate and maintain forwarding information in accordance with the routing information. The forwarding information associates network routes with specific forwarding next hops and corresponding interface ports of the router. The forwarding information, therefore, is based on the information contained within routing information. By maintaining forwarding information, forwarding next hops can be quickly identified, resulting in improved throughput by a given router.

The connection between two devices on a network is generally referred to as a link. Connections between devices of different autonomous systems are referred to as external links while connections between devices within the same autonomous system are referred to as internal links. Many conventional computer networks, including the Internet, are designed to dynamically reroute data packets when an individual link fails. Upon failure of a link, the routers transmit new connectivity information to neighboring devices, allowing each device to update its local routing table. Links can fail for any number of reasons, such as failure of the physical infrastructure between the devices, or failure of the devices interfacing with the link.

According to many routing protocols, when a router detects a link failure, the router broadcasts one or more update messages to inform neighboring routers that certain routes are no longer available and should be removed from local routing tables. The receiving routers update their routing tables based on this information and send update messages to their neighbors. This process repeats itself and the update information propagates from router to router. The form of the update message depends on the type of routing algorithm used.

Due to the size and complexity of the routing information maintained by routers within a large network, such as the Internet, a single change in network topology may require updating of tens of thousands, if not hundreds of thousands, of individual routes. For example, it is not uncommon for a single router to affect the flow of thousands of routes through the system. Accordingly, a single network event, such as the failure of a router, can force routers within the system to update hundreds of thousands of routes, which can consume considerable computing resources and substantially delay rerouting packets.

Routing tables in large networks may take a long period of time to converge to stable routing information after a network fault. One recognized cause of the delay is temporary oscillations, i.e., changes that occur within the routing tables until they converge to reflect the current network topology. These oscillations in routing information, often referred to as "flaps" or "route flaps" can cause significant problems, including intermittent loss of network connectivity as well as increased packet loss and latency.

SUMMARY

In general, the invention introduces a virtual interface that logically associates one or more backup physical interfaces with one or more active physical interfaces of a network device, such as a router. The virtual interface may be used to "hide" the presence of the backup physical interfaces from a control unit of a router. Therefore, only the virtual interface is "seen" by the router control unit for purposes of route calculation.

If a need to redirect traffic from the primary physical interface occurs, such as failure of the primary physical interface or a need to adjust packet flows, the router redirects traffic from the primary interface to the backup physical interface. As only the virtual interface is seen by the router control unit, route adjustments and the lengthy delay typically associated with selecting alternate routes is avoided. Instead, a direct modification to the forwarding information can facilitate a relatively seamless switchover from the primary to the backup physical interface. Moreover, as the switchover is transparent to the routing control unit, the generation of failure messages can also be reduced or avoided in the case of interface failure, thereby reducing the likelihood of route flaps.

One technique for directly modifying the forwarding information utilizes the concept of "indirect next hop data." As used herein, "indirect next hop data" refers to data which maps a protocol next hop to a specific forwarding next hop. By using the indirect next hop data in accordance with the principles of the invention, redirection of network traffic from a primary physical interface to a backup physical interface can be accelerated.

In one embodiment, a method comprises defining a virtual interface for a plurality of physical interfaces of a network device, associating network routes with the virtual interface, and forwarding packets associated with the network routes through at least one of the plurality of physical interfaces.

In another embodiment, a method of routing packets from a router comprises mapping a virtual interface of a router control unit to a selected one of a primary physical interface and a backup physical interface of the router, and routing the packets from the router via the selected one of the primary physical interface and the backup physical interface.

In another embodiment, a method comprises defining a virtual interface for a plurality of physical interfaces of a network device, and communicating over the virtual interface to exchange routing information. The method may further comprise selecting at least one of the physical interfaces as a primary physical interface of the virtual interface; and exchanging the routing information over the primary interface.

In some cases, the invention may be implemented in software. In such embodiments, the invention may be directed to a computer-readable medium comprising executable instructions which are executed in a network device, such as a router. The instructions, when executed, define a virtual interface for a plurality of physical interfaces of a network device, associate network routes with the virtual interface, and forward packets associated with the network routes through at least one of the plurality of physical interfaces.

In another embodiment, a computer-readable medium comprises executable instructions which are executed in a network device, wherein the instructions when executed define a virtual interface for a plurality of physical interfaces of a network device, and communicate over the virtual interface to exchange routing information.

In another embodiment, a network device comprises a plurality of physical interfaces, and a control unit defining a virtual interface for the plurality of physical interfaces, wherein the control unit selects at least one of the physical interfaces associated with the virtual interface as a primary physical interface, associates network routes with the virtual interface, and forwards packets associated with the network routes through the primary physical interface.

In another embodiment, a network device comprises a plurality of physical interfaces, and a control unit defining a virtual interface for the plurality of physical interfaces, wherein the control unit selects at least one of the physical interfaces associated with the virtual interface as a primary physical interface and communicates over the virtual interface to exchange routing information.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
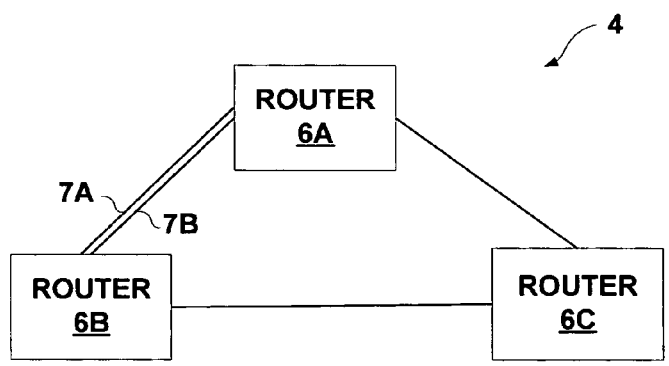
FIG. 1 is a block diagram illustrating a portion of a computer network including a collection of routers.

FIG. 1 is a block diagram illustrating a portion of a network 4 including a collection of routers 6A-6C (collectively, "routers 6") which forward network packets to and from various destinations within network 4. Routers 6 are interconnected by a number of physical communication links, represented by solid lines in FIG. 1.

Routers 6 use one or more routing protocols, such as the Border Gateway Protocol (BGP), to exchange routing information about the topology of network 4. Although the simplified illustration of FIG. 1 illustrates three routers, a larger number of routers and other network devices may be included in network 4. Communication between routers 6 is essential to ensure that routers 6 maintain accurate routing information indicative of the network topology.

By way of example, routers 6 may communicate with one another via BGP, EBGP, IBGP, ISIS, OSPF, RIP, or any other routing protocol. Routers 6 generally represent routers of an autonomous system, routers of different autonomous systems, edge routers, core routers, or any type of routing device within a large or small computer network. Again, although three routers are illustrated for simplicity, a larger number of other routers and network devices may also be included within network 4.

In some cases, routers 6 maintain backup interfaces for one or more network paths. For example, as illustrated in FIG. 1, routers 6A and 6B are connected via two different links 7A and 7B. However, links 7A and 7B between routers 6A and 6B are not active at the same time. Instead, link 7A is a primary link and link 7B is a backup link.

Routers 6A and 6B include interfaces for the respective links 7A and 7B. In particular, routers 6A and 6B include a primary interface and a backup interface for the respective links 7A and 7B. The use of primary and backup interfaces adds redundancy to network 4 so that if network traffic needs to be redirected, packets can be quickly rerouted through the backup interface. Such redundancy can increase the integrity of network 4 and is particularly useful for certain applications where timely delivery of the packets is essential. Primary and backup interfaces may also be used with a common communication link, thereby adding redundancy, e.g., for failure of an interface on a router.

In accordance with the principles of the invention, routers 6 implement virtual interfaces to hide the presence of multiple redundant backup interfaces from control logic within routers 6. Thus, if traffic needs to be redirected, a given one of routers 6 can switch to the backup interface without requiring an update of network routes through the backup interface. Instead, control logic of one of routers 6 forward the routes though a different physical interface without updating routes with respect to the backup interface. In this sense, the presence of multiple physical interfaces is hidden from the respective control logic of routers 6 by a virtual interface, which is presented to the control logic instead of the individual physical interfaces.

Then, for example, if one physical interface fails, the same routes can apply by logically switching from the failed physical interface to the backup interface, and route updating can be avoided. Rather, a slight modification to forwarding information can facilitate a relatively seamless switchover from the primary to the backup interface. Moreover, generation of failure messages can also be reduced or avoided, thereby reducing the likelihood of route flaps within computer network 4. In other embodiments, switchover from primary to backup interface can occur for other reasons unrelated to interface failure, e.g., to improve packet flows, to reduce error rates, to reduce data congestion, to improve quality of service, or other reasons.

Router 6A implements a virtual interface that associates a primary physical interface and a backup physical interface, and initially maps the virtual interface to the primary physical interface. The primary and backup interfaces may correspond to links 7A and 7B, respectively, or may be associated with a common link. In one example, if the primary interface fails, e.g., because of failure of link 7A, router 6A remaps the virtual interface to the backup physical interface associated with link 7B. The routing information does not need to change when the interface is switched from primary to backup, however, because router 6A created the routing information based on the virtual interface. Thus, a relatively simple remapping of the virtual interface can result in more seamless transition from the primary physical interface to the backup physical interface, and avoid the need to recalculate the routing information. For example, as described in further detail below, to quickly reroute the packets, router 6A may modify "indirect next hop data" so that packets initially routed through the primary physical interface are simply sent through the backup physical interface. This modification of the indirect next hop data may occur within a forwarding plane of router 6A, and the routing protocols executing within router 6A may even be unaware of the switchover from the primary to backup physical interface. In this manner, the need to recalculate routing information can be avoided, and route flaps through network 4 can likewise be avoided.

Router 6A may define a virtual interface for a plurality of physical interfaces, and communicate over the virtual interface to exchange routing information. A router control unit may execute this technique. The router control unit (described in greater detail below) may further select at least one of the physical interfaces as a primary physical interface of the virtual interface, and exchange the routing information over the primary physical interface.

Although discussed in the context of a network router, the principles of the invention may also be applied to other network devices that communicate network traffic. For example, the techniques may be applied by a network switch, intelligent hub, firewall or other network device. Moreover, although packet-based networks are described herein, other types of data units may also be used consistent with the principles of the invention. For instance, the term "packet" is used to generally describe a unit of data communicated between resources in conformance with a communication protocol. Accordingly, "packet" is used to encompass any unit of data, and may be interchanged with the term "cell," "frame," or other similar terms used to describe a unit of data communicated within the network.

Figure 2:
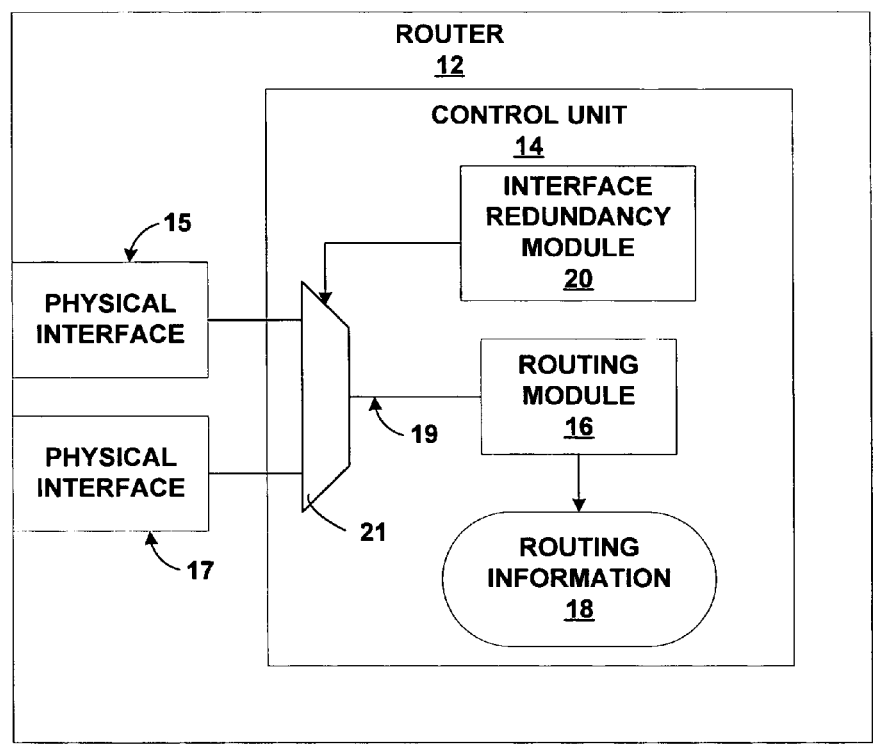
FIGS. 2-4 are block diagrams illustrating example embodiments of routers consistent with the principles of the invention.

FIG. 2 is a block diagram of an exemplary embodiment of a router 12, which may correspond to any of routers 6 illustrated in FIG. 1. In the illustrated embodiment, router 12 includes a control unit 14 and a plurality of physical interfaces 15, 17. Control unit 14 may be implemented solely in software, or hardware, or may be implemented as a combination of software, hardware, or firmware. For example, control unit 14 may include one or more processors which execute software instructions in order to route packets through router 12. In that case, the various modules of control unit 14 may comprise executable instructions stored on a computer-readable medium, such as computer memory or hard disk.

Routing module 16 maintains routing information 18 to reflect the current network topology. Routing information 18 may be used by generate forwarding information (not shown) that associates IP address prefixes with specific forwarding next hops (FNHs). The forwarding information, for example, may comprise a radix tree including a number of leaf nodes which correspond to network routes. In any case, routing module 16 stores available network routes as routing information 18, which is then used to generate forwarding information to route incoming packets to the appropriate next hop toward the respective destinations of the packets. Routing information 18 may be arranged as a radix tree, one or more tables, lists, or other data structures that store the network routes in the form of network addresses, forwarding next hops, or any other manner.

Routing module 16 communicates over the network via one of physical interfaces 15, 17 in order to send and receive updates with respect to routing information 18. Physical interface 15 can be thought of as a primary interface for carrying traffic, and physical interface 17 can be thought of as a backup interface for the traffic. Consequently, backup physical interface 17 provides redundancy so that if a condition arises such that traffic need to be redirected from primary interface, such as if primary physical interface 15 fails, backup physical interface 17 can be used. Again, however, in accordance with the principles of the invention switchover from primary to backup interface can also occur for other reasons unrelated to interface failure, e.g., to improve packet flows, to reduce error rates, to reduce data congestion, to improve quality of service, or other reasons.

Routing module 16 communicates according to one or more of the routing protocols mentioned above. Again, such routing protocols may include BGP, EBGP, IBGP, ISIS, OSPF, RIP, and/or others.

In accordance with the techniques described herein, routing module 16 is shielded from the presence of multiple physical interfaces 15, 17. Instead, control logic 21 associates physical interfaces 15, 17 with a single "virtual interface" 19, and presents only virtual interface 19 to routing module 16. When updating routing information and performing route calculation, routing module 16 need only consider virtual interface 19. Consequently, routing module 16 is unaware of the presence of multiple physical interfaces 15, 17 and generally unaware of a switchover from physical interface 15 to physical interface 17 by interface redundancy module 20 in response to a network event. Although a single virtual interface 19 is shown, embodiments consistent with the principles of the invention may have multiple virtual interfaces.

Interface redundancy module 20 monitors physical interfaces 15, 17 and invokes control logic 21 to map virtual interface 19 to the appropriate one of physical interfaces 15, 17. For example, interface redundancy module 20 can map virtual interface 19 to primary physical interface 15 unless and until virtual interface 19 need to be redirected to physical interface 17. When this happens, interface redundancy module 20 remaps virtual interface 19 to backup physical interface 17. In this manner, switchover of virtual interface 19 from primary physical interface 15 to backup physical interface 17 can be made transparent to routing module 16. Consequently, routing module 16 need not select alternate routes, and need not generate routing update messages to peer devices. As a result, network traffic may be more quickly redirected from primary physical interface 15 to backup physical interface 17, and the overall operation of the network may be improved by reducing the occurrence of route flaps.

Although the techniques are described with reference to packet routing by routing module 16, the techniques may also be applied to shield the presence of one or more backup physical interfaces from other network services, such as virtual private networks (VPNs), quality of service (QoS), voice over IP (VOIP), multimedia streaming, or other services.

For exemplary purposes, the mapping between physical interfaces 15, 17 and virtual interface 19 is illustrated in FIG. 2 as two-to-one. However, the invention is not limited in that respect. As one example, N+1 physical interfaces can be mapped to N virtual interfaces. In other words, a single backup physical interface may be implemented with respect to a plurality of primary physical interfaces. If traffic on one physical interface needs to be redirected, the backup interface can be used for the redirected traffic, and this redirection can be shielded from routing module 16. More generally, M physical interfaces can be mapped to N virtual interfaces, where M>N.

Figure 3:
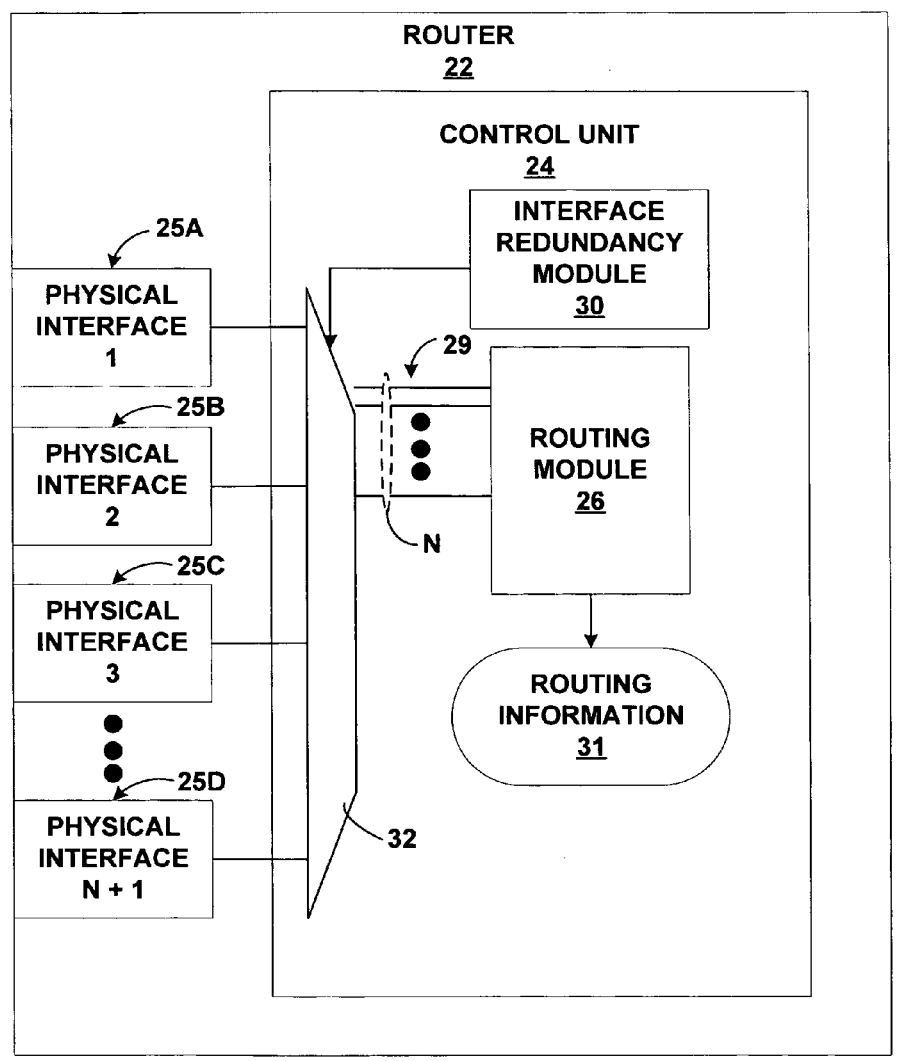

In general, router 12 defines a virtual interface 19 for a plurality of physical interfaces 15, 17, and communicates over the virtual interface to exchange routing information. By way of example, router control unit 14 may execute this technique using exemplary components, as shown in FIG. 3, or other components. Control unit 14 may also select at least one of the physical interfaces 15, 17 as a primary physical interface of the virtual interface 19, and exchange the routing information over the primary physical interface.

FIG. 3 is another block diagram of a router 22 that illustrates the more general applicability of the techniques described herein. In the exemplary embodiment of FIG. 3, router 22 includes a control unit 24 and a plurality (N+1) physical interfaces 25A, 25B, 25C and 25D (collectively, "physical interfaces 25"). Again, control unit 24 may be implemented solely in software, or hardware, or may be implemented as a combination of software, hardware, or firmware. For example, control unit 24 may include one or more processors which execute software instructions in order to route packets through router 22.

Routing module 26 communicates according to one or more of the routing protocols mentioned above. For example, routing module 26 may communicate packets with other routers according to BGP, EBGP, IBGP, ISIS, OSPF, RIP, or any another routing protocol.

In this embodiment, routing module 26 is shielded from the presence of N+1 physical interfaces 25. Instead, routing module 26 is presented with N virtual interfaces 29 for purposes of route calculation. Thus, routing module 26 makes use of virtual interfaces 29 when selecting routes. In particular, routing module 26 calculates or otherwise associates the network routes for packets to virtual interfaces 29 and any physical interfaces not associated with one of the virtual interfaces. Consequently, routing module 26 is unaware of that an extra "backup" physical interface exists.

Interface redundancy module 30 monitors physical interfaces 25 and invokes control logic 32 to map virtual interfaces 29 to the appropriate ones of physical interfaces 25. For example, interface redundancy module 30 can map virtual interfaces 29 to primary ones of physical interfaces 25 unless and until traffic needs to be redirected from one of the primary interfaces. To redirect traffic, interface redundancy module 30 remaps a given one of virtual interfaces 29 to the backup interface of physical interfaces 25. In this manner, switchover from a primary physical interface to a backup physical interface is transparent to routing module 26. Consequently, routing module 26 does not need to calculate new routes to facilitate switchover from primary to backup interface, and can avoid generation of routing update messages. Both of these factors can result in accelerated traffic redirection and improved overall operation of the network.

In general, the functionality described in reference to control unit 24 may be implemented as executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. Moreover, the functionality may be implemented by executing the instructions of the computer-readable medium with one or more processors, discrete hardware circuitry, firmware, software executing on a programmable processor, or a combination of any of the above.

Figure 4:
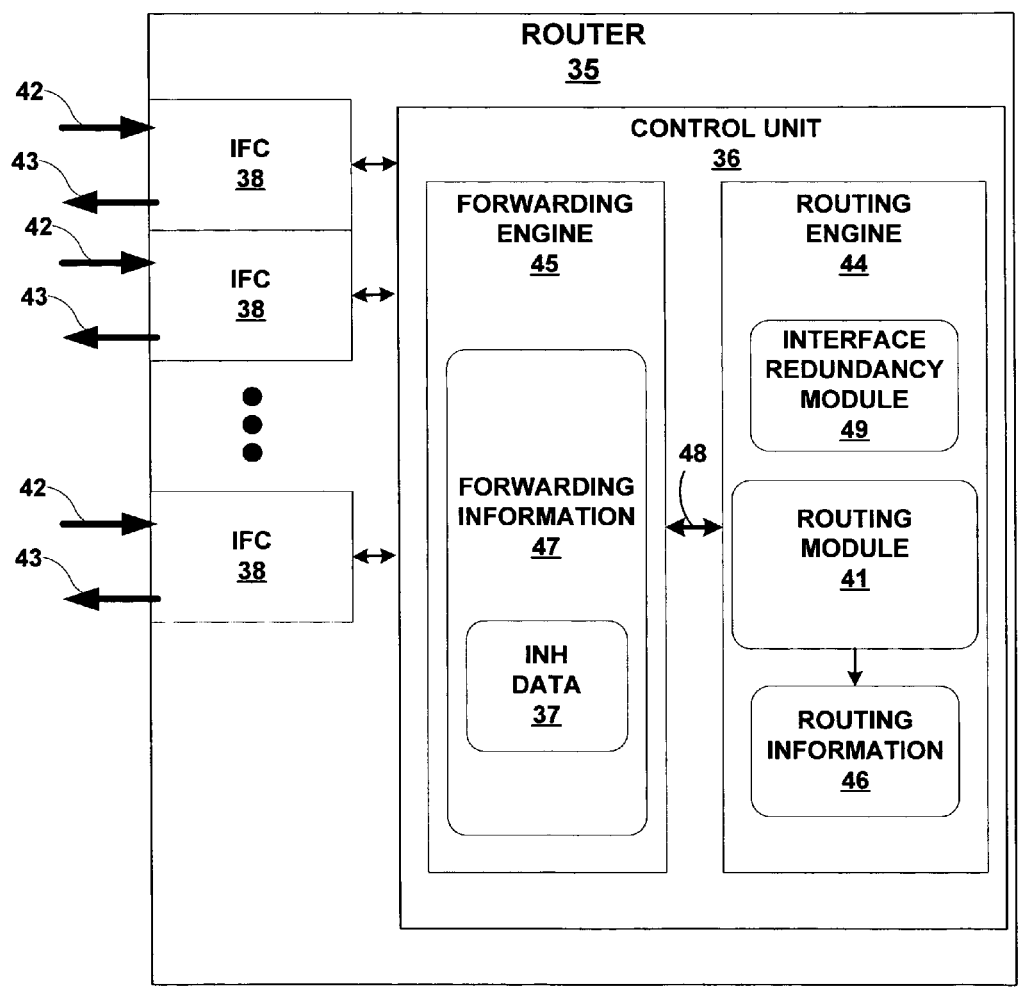

FIG. 4 is a more detailed exemplary block diagram illustrating another example router 35 configured consistent with the principles of the invention. Router 35 includes control unit 36 that directs inbound packets received from inbound links 42 to the appropriate outbound links 43. In particular, the functionality of control unit 36 is divided between a routing engine 44 and a packet forwarding engine 45. Physical interfaces are implemented as interface cards (IFCs) 38 which send and receive packets via the inbound and outbound links 42, 43. In particular, each of IFCs 38 may include one or more ports, corresponding to one or more physical interfaces of router 35. Put another way, each of IFCs 38 may include one or many physical interfaces.

In the illustrated embodiment, functionality of control unit 36 is divided between routing engine 44 and forwarding engine 45. In general, routing engine 44 is primarily responsible for maintaining routing information 46 to reflect the current network topology. In particular, routing engine 44 periodically updates routing information 46 to accurately reflect the network topology. Routing module 41 facilitates such updates to routing information 46 by communicating with other routers in the network.

In addition, routing module 41 periodically updates the network routes and generates forwarding information 47 that associates network destinations with specific next hops and corresponding interface ports of IFCs 38. Forwarding information 47 may, therefore, be thought of as a subset of the information contained within routing information 46. Routing engine 44 communicates forwarding information 47 to packet forwarding engine 45 for use in forwarding network traffic. Upon receiving an inbound packet, forwarding engine 45 directs the inbound packet to an appropriate one of IFCs 38 in accordance with forwarding information 47 for outbound transmission.

If an incoming packet is destined for router 35 itself, forwarding engine 45 directs the inbound packet to routing module 41 via data communication channel 48. Routing module 41, for example, may use information in received packets to update routing information 46 consistent with network changes or events.

In one embodiment, each of packet forwarding engine 45 and routing engine 44 may comprise one or more dedicated processors, hardware, and the like, and may be communicatively coupled by data communication channel 48. Data communication channel 48 may be a high-speed network connection, bus, shared-memory or other data communication mechanism.

When routing engine 44 receives packets indicating that a network event has occurred, such as a router failure, routing module 41 updates routing information 46 and directs packet forwarding engine 45 to update forwarding information 47. Routing module 41 may, for example, communicate one or more messages over data communication channel 48 directing packet forwarding engine 45 to update the next hop data for one or more network destinations.

As described herein according to the principles of the invention, routing module 41 routes packets in accordance with one or more virtual interfaces. Moreover, interface redundancy module 49 maps each virtual interface to a corresponding physical interface in one of interface cards 38. If traffic needs to be redirected from one physical interface to another, e.g., because of an interface failure, to improve packet flow, or for another reason, interface redundancy module 49 remaps the corresponding virtual interface to a different (backup) physical interface. This remapping between virtual and physical interfaces is transparent to routing module 41, thereby avoiding the need to select or calculate alternate routes in response to redirecting of traffic. Instead of calculating new routes, control unit 36 continues to use the selected routes that are defined with respect to the virtual interface. By remapping the virtual interface, interface redundancy unit 49 automatically redirects network traffic associated with those routes from the primary physical interface to the backup physical interface.

In addition, interface redundancy module 49 may also direct forwarding engine 45 to modify indirect next hop ("INH") data 37 of forwarding information 47 consistent with this remapping. As used herein, "indirect next hop data" refers to the use of indirect references, i.e., intermediate data structures, to associate routes with forwarding next hops and corresponding physical interface ports. In other words, these intermediate data structures map a protocol next hop ("PNH") to a specific forwarding next hop ("FNH").

A protocol next hop (PNH) for a destination is the "next" device or router where a packet for that destination should be sent. A router usually gets this information via routing protocols; a protocol next hop need not be a device directly connected to the router. A forwarding next hop (FNH) is the action that a router takes within its forwarding engine to send a packet one step closer to its destination.

In other words, a PNH, as used herein, generally refers to the next hop along a route as disseminated in accordance with a routing protocol, such as BGP. For example, a BGP-enabled router may be considered the PNH for another BGP-enabled router, even though the BGP-enabled routers may be connected by one or more non-BGP enabled routers. The PNH typically specifies an Internet Protocol (IP) address of the router. Conversely, a FNH from along a given route typically refers to a neighboring router physically coupled to a source router along that route. For example, a FNH for a route may specify a physical interface and media access control (MAC) address for the interface associated with the neighboring router. A FNH may alternatively or additionally specify label swapping operations or other actions to be taken by the forwarding engine.

By introducing this layer of indirect references, e.g., INH data 37, redirection from a primary interface to a backup interface can be greatly accelerated. For example, thousands of calculated routes may ultimately result in PNHs which map to a common FNH. By introducing INH data 37, a large set of similar PNHs can be easily and simultaneously rerouted to a different physical interface by changing a single intermediate reference that maps the set of PNHs to the FNH.

Routing engine 44 generates and maintains INH data 37 in accordance with routing information 46. INH data 37 may comprise a mapping between protocol-level routing information and respective forwarding information in the form of a (key, value) pair. In one embodiment, for example, routing engine 44 represents INH data 37 within routing information 46 as unique associations of PNHs and FNHs. Accordingly, routing engine 44 may maintain a set of valid indexes into INH data 37, each of which identify a unique (PNH, FNH) pair. Other protocol-level information can be incorporated within the key, such as export policy, Quality-of-Service (QoS) class, VPN label, MPLS label, and the like. Routing engine 44 communicates the INH data to forwarding engine 45, which stores the data as INH data 37.

Routing engine 44 may maintain routing information 46 to include a number of route entries within one or more data sources, and one or more radix trees having route nodes. The nodes may be threaded together using pointers or linked lists to represent the FNH dependencies between routes. Routing module 41 performs route calculations or adjustments by traversing one or more radix trees according to the PNH associated with the route. In this manner, routing module 41 defines specific FNHs for each route. Packets are then forwarded in accordance with INH data 37 which indirectly maps sets of PNHs with common FNHs.

When traffic needs to be redirected from a primary interface, e.g., a physical interface located on one of IFCs 38, interface redundancy module 49 selects a different (backup) physical interface and remaps the corresponding virtual interface seen by routing module 41 to the backup physical interface. In addition, interface redundancy module 49 issues messages to forwarding engine 45 over data communication channel 48 to direct the forwarding engine to modify INH data 37. In particular, interface redundancy module 49 directs forwarding engine 45 to re-map the set of PNHs currently mapped to the primary physical interface to the backup physical interface. For example, routing engine 44 may generate a single message directing packet forwarding engine 45 to overwrite a common next hop datum referenced by indirect next hop data structures within leaf nodes of a forwarding tree. This can greatly reduce the number of messages between routing engine 44 and packet forwarding engine 45, primarily because the number of messages is no longer a function of the number of routes affected by the change, as with conventional routers. In this manner, a relatively simple change to indirect references of INH data 37 result in the rerouting of a large number of routes from the primary interface to the backup interface.

The architecture of router 35 illustrated in FIG. 4 is for exemplary purposes only, and the invention is not limited to this architecture. In one embodiment, for example, forwarding engine 45, routing engine 44, or both, may be replicated and incorporated directly within IFCs 38.

Figure 5A:
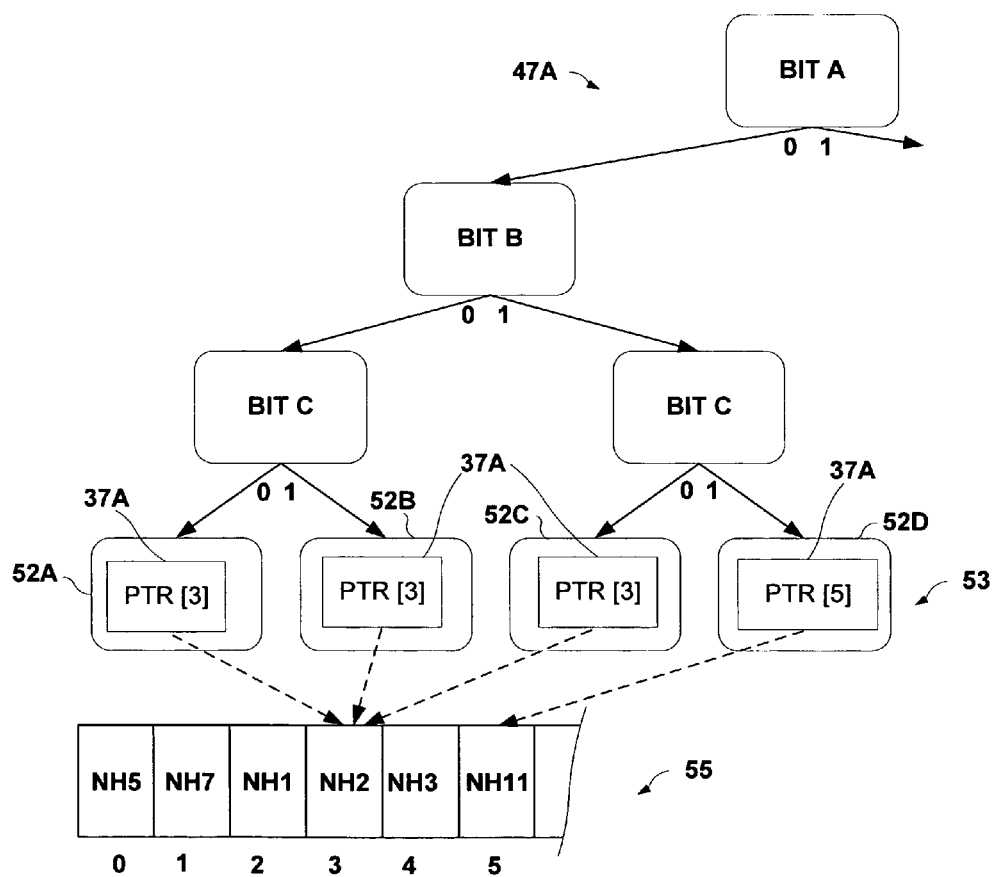
FIGS. 5A and 5B are block diagrams illustrating exemplary data structures including indirect next hop data consistent with the principles of the invention.

FIG. 5A is a block diagram illustrating example data structures 47A for one exemplary arrangement of forwarding information 47 (FIG. 4). In the illustrated embodiment, forwarding information 47 is arranged as a radix tree of data structures 47A. Moreover, the radix tree includes indirect next hop data 37A that maps protocol next hops 53 to forwarding next hops hop data 55. More specifically, the radix tree includes a number of leaf nodes 52A, 52B, 52C, 52D, (collectively, "leaf nodes 52"). Each of leaf nodes 52 corresponds to a different network destination. For large networks, the radix tree can become sizable and may easily include over a million leaf nodes 52. Therefore, for exemplary purposes, FIG. 5A depicts a portion of the radix tree of forwarding information 47.

The arrangement of forwarding information 47 as a radix tree is illustrated in FIG. 5A for exemplary purposes. The principles of invention may readily be applied to other arrangements. Forwarding information 47 (FIG. 4) may be arranged, for example, as a number of tables, link lists, or other data structures that store indirect next hop data that maps between protocol next hops and forwarding next hops.

Leaf nodes 52A, 52B and 52C represent destinations within a network, i.e., PNHs, and are mapped to FNH data 55 stored in a separate data structure. In this fashion, indirect next hop data 37A provides intermediate data structures that relate PNHs to FNHs. In alternative embodiments, the radix tree may store references to specific interface ports, processing modules, or both.

Upon associating a key of an inbound packet to one of leaf nodes 52, forwarding engine 45 uses indirect next hop data 37A to forward the packet. For example, upon associating a key of an inbound packet to leaf node data structure 52C, forwarding engine 45 uses the pointer contained within leaf node data structure 52C to access the fourth element of FNH data 55, i.e., element 3, which stores data referencing a specific forwarding next hop ("NH2"). Accordingly, forwarding engine 45 forwards the inbound packet to the appropriate one of IFCs 38 for transmission to the specified FNH.

However, if interface redundancy module 49 (FIG. 4) needs to remap the virtual interface seen by routing module 41, interface redundancy module 49 can also modify indirect next hop data 37A to re-associate protocol next hops with forwarding next hops. For example, interface redundancy module 49 can change the fourth element (element 3 "NH2") of FNH data 55 so that leaf nodes 52A, 52B and 52C of protocol next hops 53 point to a different next hop, and thus a different interface. In this scheme, for example, each physical interface can map to a unique FNH. Thus, a simple change to a given FNH in FNH data 55 can affect thousands of leaf nodes which point to that element. Accordingly, a relatively simple change to an INH data structure can cause rerouting of a large number of routes from a primary interface to a backup interface.

Figure 5B:
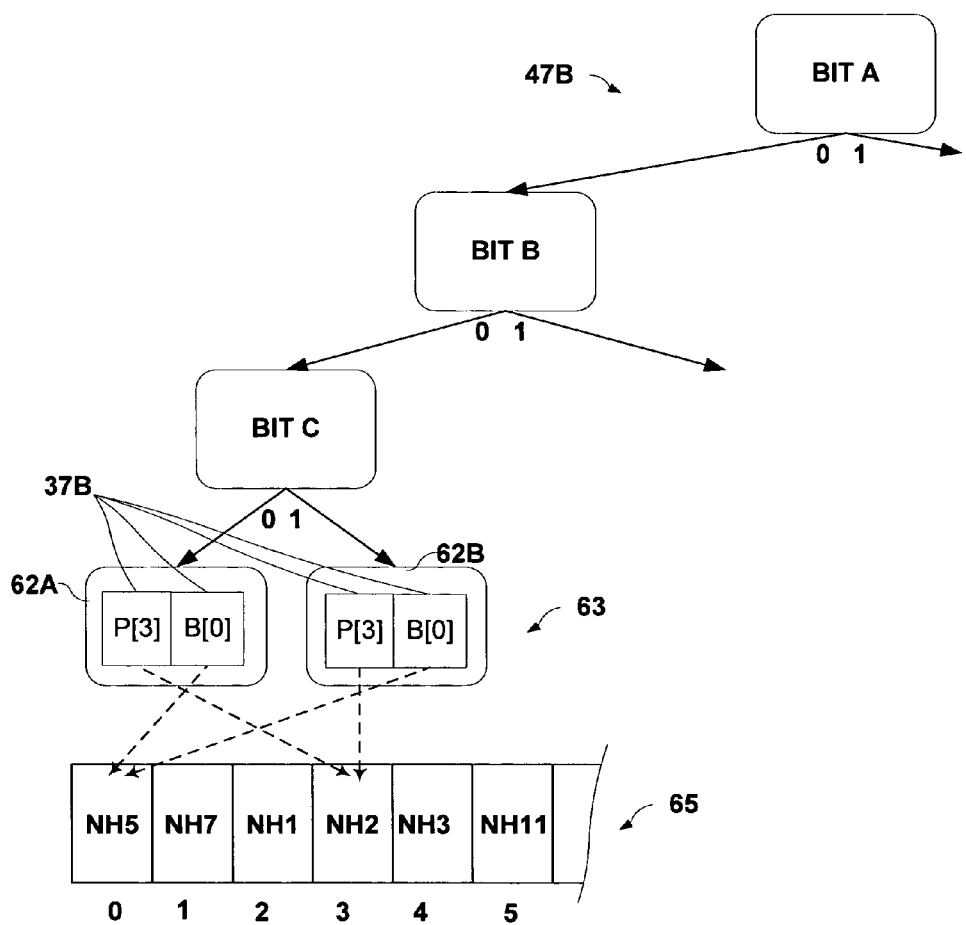

FIG. 5B is a block diagram illustrating data structures 47B for a second exemplary arrangement of forwarding information 47 (FIG. 4). In this illustrated embodiment, indirect next hop data 37B maps PNHs to FNH data 65. More specifically, the radix tree includes leaf nodes 62A, 62B, (collectively, "leaf nodes 62"). Each of leaf nodes 62 corresponds to a different network destination. Again, however, the principles of invention may readily be applied to other arrangements. Data structures 47B may be arranged, for example, as a number of tables, link lists, or other data structures that store indirect next hop data that maps between protocol next hops and forwarding next hops. Indirect next hop data 37B is stored within forwarding information 47 to facilitate packet routing.

In this example, each of leaf nodes 62 includes multiple references to forwarding next hop data 65. Each of leaf nodes 62A and 62B, for example, include primary (P) references and backup (B) references, which may comprise pointers to specific FNHs. For exemplary purposes, the primary references of leaf nodes 62A and 62B reference a common portion of forwarding next hop data 65. The backup references of leaf nodes 62A and 62B also reference a common backup next hop, as identified within element 0 of forwarding next hop data 65 ("NH 5").

If interface redundancy module 49 (FIG. 4) needs to remap the virtual interface seen by routing module 41, interface redundancy module 49 directs packet forwarding engine 45 to modify indirect next hop data 37B to re-associate PNHs that are currently mapped to the primary physical interface with a different FNH. For example, interface redundancy module 49 can cause specific nodes in PNH data 63 to select the backup references rather than the primary references. In particular, interface redundancy module 49 can cause nodes 62A and 62B to select the backup references, thereby switching the output of those nodes from the interface associated with next hop 2 (element 3 of forwarding next hop data 65) to the interface associated with next hop 5 (element 0 of forwarding next hop data 65). Thus, a simple change to elements of protocol next hop data 53 can affect thousands of routes. Accordingly, a relatively simple change to an INH data structure can cause rerouting of a large number of routes from a primary interface to a backup interface. In general, the invention contemplates a variety of relatively simple modifications to the associations defined in indirect next hop data 37A or 37B.

Figure 6:
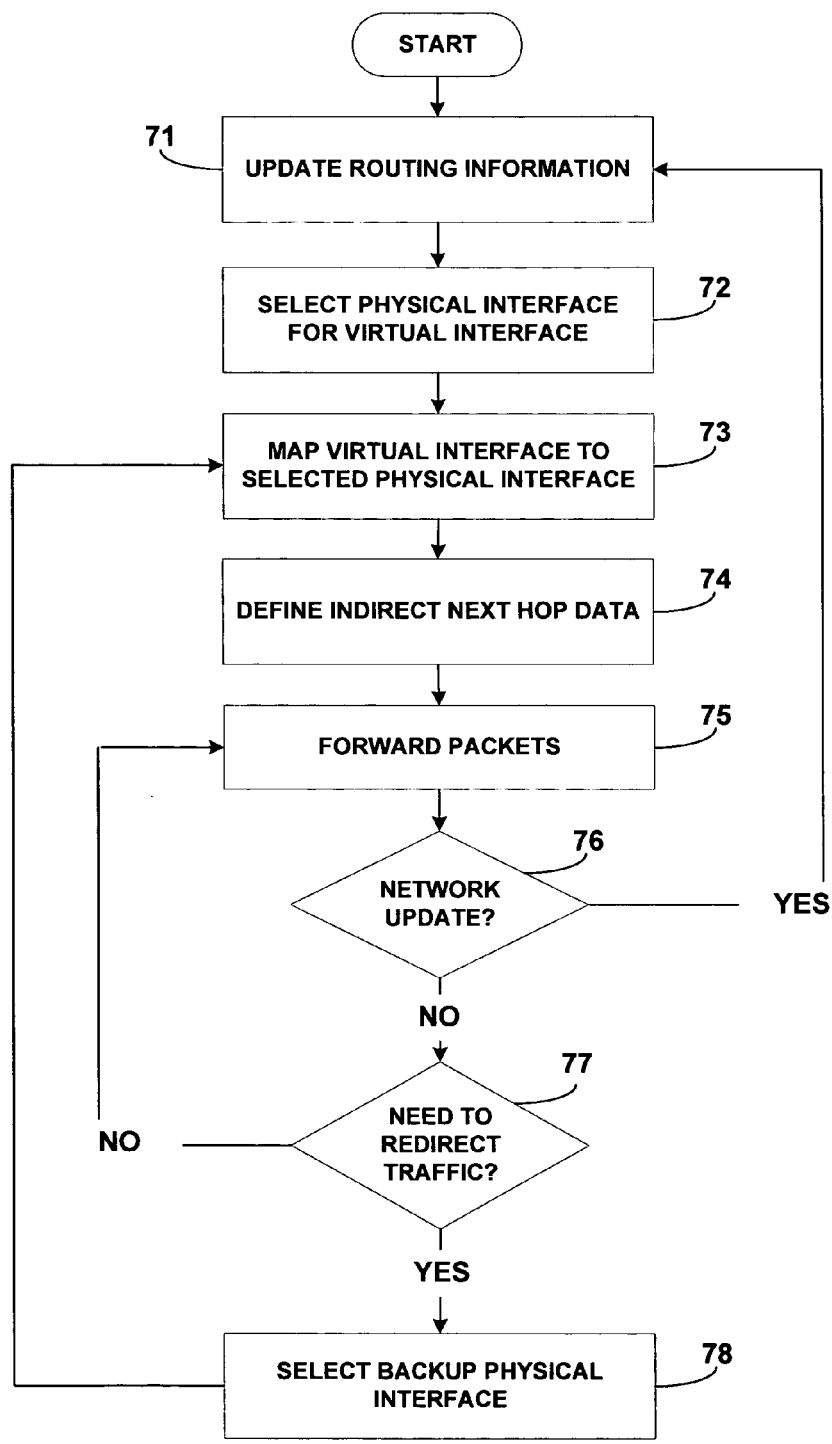
FIG. 6 is a flow chart illustrating an example operation of a network device consistent with the principles of the invention.

FIG. 6 is a flow chart illustrating a process according to the principles of the invention. For purposes of example, FIG. 6 will be described with reference to router 35 (FIG. 4). Initially, routing module 41 updates it routing information, e.g., in response to update messages received from other routers (71). The updating of routing information (71) may include the calculation of forwarding next hops. Interface redundancy module 49 selects a physical interface from one of IFCs 38 for a virtual interface seen by routing module 41 (72). Interface redundancy module 49 may invoke control logic in order to map the virtual interface to the selected one of the plurality of physical interfaces (73). In addition, routing unit 44 defines INH data to map PNHs to FNHs. Router 35 then forwards packets via the selected physical interface (75).

Generally, at any point in this process, receipt of a network update message (yes branch of 76) may cause router 35 to update its internal routing information (71). However, redirecting traffic from a physical interface associated with the virtual interface (yes branch of 77) does not necessary require such updates. Instead, when traffic needs to be redirected (yes branch of 77), interface redundancy module 49 determines whether a backup physical interface is available and, if so, selects the backup physical interface from one of IFCs 38 associated with the virtual interface seen by routing module 41 (78). Interface redundancy module 41 may invoke control logic in order to remap the virtual interface to the selected backup physical interface (73). In addition, routing unit 44 updates or otherwise redefines the INH data (74), thereby remapping PNHs to FNHs. Router 35 then forwards the packets via the newly selected backup physical interface (75). In this manner, network traffic may be seamlessly redirected to the backup physical interface without lengthy delay typically associated with route updating.

Various embodiments of the invention have been described. For example, routers have been described which implement the concept of a virtual interface to hide the presence of one or more redundant backup interfaces from the router control unit. Thus, if traffic need to be redirected from a primary router interface, e.g., because of an interface failure, to improve packet flows, or another reason, the router can switch to the backup interface without necessarily updating routes. Instead, the router control unit uses the same routes, but forward the routes though a different physical interface. In addition, the routers can make use of the INH data to reduce the computational requirements needed to facilitate switchover from a primary interface to the backup interface. One of the key benefits of a virtual interface is that there is no change to routing information when a component physical interface goes down.

In accordance with the principles of the invention, the techniques and embodiments described herein may be implemented in hardware, software, firmware, or any combination thereof. If implemented in software, the techniques may be directed to a computer-readable medium in a router, comprising program code that when executed in the router performs one or more of the techniques described herein. The router, for example, may include one or more processors which access the instructions stored on the computer-readable medium, and execute the instructions in order to perform one or more the techniques described herein.

Although generally discussed in the context of a network router, the principles of the invention may be applied to other devices network devices that communicate network traffic. For example, the techniques may be applied by a network switch, intelligent hub, firewall or other network device. Moreover, although packet-based networks are described herein, other types of data units may also be used consistent with the principles of the invention. For instance, the term "packet" is used to generally describe a unit of data communicated between resources in conformance with a communication protocol. The principles of the invention may be readily applied to a variety of protocols, such as Transmission Control Protocol (TCP), the Internet Protocol (IP), Multiprotocol Label Switch (MPLS), Asynchronous Transfer Mode (ATM), Frame Relay, and the like. Accordingly, "packet" is used to encompass any such unit of data, and may be interchanged with the term "cell," "datagram," or other similar terms used in such protocols to describe a unit of data communicated between resources within the network.

In addition, although the techniques have been described as elements embodied within a single device, the described elements may be distributed to multiple devices. The term "system," is used herein to generally refer to embodiments of the invention in which the described elements are embodied within a single network device or distributed to multiple network devices.

The switchover techniques may be invoked in response to detected interface failure, or many other reasons. For example, switchover from primary to backup interface could also be done in response to the detection of error rates on a given physical interface over a threshold. In still other examples, switchover from primary to backup interface may be performed to reduce traffic congestion or to implement quality of service. These and other embodiments are within the scope of the following claims.

The invention claimed is:

1. A method comprising:
presenting a plurality of physical interfaces of a network device to routing control logic of the network device as a single virtual interface;
performing route calculation with respect to the virtual interface to generate routing information that associates one or more network routes with the virtual interface;
mapping the virtual interface to a first one of the physical interfaces;
forwarding traffic of the one or more network routes associated with the virtual interface via the first one of the physical interfaces in accordance with the mapping;
in response to detecting a network event, remapping the virtual interface to a second one of the physical interfaces; and
forwarding at least a portion of the traffic of the one or more network routes associated with the virtual interface via the second one of the physical interfaces in accordance with the mapping.

2. The method of claim 1, wherein mapping the virtual interface to the first one of the physical interfaces comprises mapping the virtual interface to one of the physical interfaces designated as a primary physical interface.

3. The method of claim 2, further comprising:
detecting the network event that indicates a need to redirect at least a portion of the traffic from the first physical interface; and
remapping the virtual interface to a second one of the physical interfaces designated as a backup physical interface in response to detecting the network event.

4. The method of claim 1, wherein forwarding packets via the second one of the physical interfaces associated with the virtual interface in response to detecting the network event comprises redirecting the traffic to the second one of the physical interfaces without updating the routing information.

5. The method of claim 1, wherein the virtual interface comprises a first virtual interface, the method further comprising
updating network routes for traffic through a plurality of virtual interfaces; and
selecting a plurality of active physical interfaces from the plurality of physical interfaces, wherein there are N virtual interfaces and M physical interfaces, where N<M.

6. The method of claim 5, wherein there are N active physical interfaces.

7. The method of claim 1, wherein forwarding traffic of the network routes through the first physical interface includes forwarding the packets in accordance with indirect next hop data which associates protocol next hops with forwarding next hops.

8. The method of claim 7, further comprising detecting a need to redirect traffic from the first physical interface and selecting the second physical interface to correspond to the virtual interface, wherein forwarding the packets includes forwarding the traffic via the second physical interface by selecting different forwarding next hops for the indirect next hop data.

9. The method of claim 7, wherein the indirect next hop data includes a first pointer and a second pointer, the method further comprising detecting a need to redirect traffic from the first physical interface and selecting a the second physical interface to correspond to the virtual interface, wherein forwarding the packets includes forwarding the packets via the second physical interface by selecting the second pointer within the indirect next hop data.

10. The method of claim 1, wherein associating the network routes includes updating the network routes according to a quality of service (QoS) protocol.

11. The method of claim 1, wherein associating the network routes includes updating the network routes according to a virtual private network (VPN) protocol.

12. A computer-readable medium storing executable instructions which are executed in a network device, wherein the instructions when executed:
present a plurality of physical interfaces of a network device to routing control logic of the network device as a single virtual interface;
perform route calculation with respect to the virtual interface to generate routing information that associates one or more network routes with the virtual interface;
map the virtual interface to a first one of the physical interfaces;

forward traffic of the one or more network routes associated with the virtual interface via the first one of the physical interfaces in accordance with the mapping;

in response to detecting a network event, remap the virtual interface to a second one of the physical interfaces; and forward at least a portion of the traffic of the one or more network routes associated with the virtual interface via the second one of the physical interfaces in accordance with the mapping.

13. The computer-readable medium of claim 12, wherein the instructions comprise instructions when executed map the virtual interface to the first one of the physical interfaces designated as a primary physical interface.

14. The computer-readable medium of claim 12, further comprising instructions that when executed:

detect the network event that indicates a need to redirect at least a portion of the traffic from the first physical interface; and remapping the virtual interface to a second one of the physical interfaces designated as a backup physical interface in response to detecting the network event.

15. The computer-readable medium of claim 12, wherein the instructions to forward the packets via the second one of the physical interfaces associated with the virtual interface in response to detecting the network event comprises redirecting the traffic to the second one of the physical interfaces without updating the routing information.

16. The computer-readable medium of claim 12, wherein the virtual interface comprises a first virtual interface, the computer-readable medium further comprising instructions that when executed:

update network routes for the traffic through a plurality of virtual interfaces; and select a plurality of active physical interfaces from the plurality of physical interfaces, wherein there are N virtual interfaces and M physical interfaces, where N<M.

17. The computer-readable medium of claim 12, further comprising instructions that when executed forward traffic of the network routes through the first physical interface by forwarding the packets in accordance with indirect next hop data which associates protocol next hops with forwarding next hops.

18. The computer-readable medium of claim 17, further comprising instructions that when executed:

detect a need to redirect traffic from the first physical interface; and select the second physical interface to correspond to the virtual interface, wherein the instructions forward the traffic via the second physical interface by selecting different forwarding next hops for the indirect next hop data.

19. The computer-readable medium of claim 17, wherein the indirect next hop data includes a first pointer and a second pointer, the computer-readable medium further comprising instructions that when executed:

detect a need to redirect traffic from the first physical interface; and select the second physical interface to correspond to the virtual interface, wherein the instructions forward the traffic via the second physical interface by selecting the second pointer within the indirect next hop data.

20. A network device comprising:

a plurality of physical interfaces; and a control unit that presents a plurality of physical interfaces of a network device to routing control logic of the network device as a single virtual interface, performs route calculation with respect to the virtual interface to generate routing information that associates one or more network routes with the virtual interface, maps the virtual interface to a first one of the physical interfaces, forwards traffic of the one or more network routes associated with the virtual interface via the first one of the physical interfaces in accordance with the mapping, in response to detecting a network event, remaps the virtual interface to a second one of the physical interfaces, and forwards at least a portion of the traffic of the one or more network routes associated with the virtual interface via the second one of the physical interfaces in accordance with the napping.

21. The network device of claim 20, wherein the control unit maps the virtual interface to one of the physical interfaces designated as a primary physical interface of the virtual interface.

22. The network device of claim 20, wherein the control unit detects the network event that indicates a need to redirect at least a portion of the traffic from the first physical interface and remaps the virtual interface to a second one of the physical interfaces designated as a backup interface in response to detecting the network event.

23. The network device of claim 20, wherein the control unit further comprises a routing engine and a packet forwarding engine, and wherein the control unit forwards the traffic by redirecting the traffic within the forwarding engine to the second one of the physical interfaces without causing the routing engine to update the routing information.

24. The network device of claim 20, wherein the virtual interface comprises a first virtual interface, and the control unit:

updates routes for the traffic through a plurality of virtual interfaces; and selects a plurality of active physical interfaces from the plurality of physical interfaces, wherein there are N virtual interfaces and M physical interfaces, where N<M.

25. The network device of claim 24, wherein there are N active physical interfaces.

26. The network device of claim 20, wherein the control unit includes a routing engine and a packet forwarding engine, and wherein the packet forwarding engine forwards packets associated with the network routes through the first physical interface by forwarding the packets in accordance with indirect next hoop data which associates protocol next hops with forwarding next hops.

27. The network device of claim 26, wherein the control unit detects a need to redirect traffic from a first physical interface and selects the second physical interface to correspond to the virtual interface, and wherein the packet forwarding engine forwards the traffic via the second physical interface by selecting different forwarding next hops for the indirect next hop data.

28. The network device of claim 26, wherein the indirect next hop data includes a first pointer and a second pointer, and the control unit detects a need to redirect traffic from a first physical interface and selects the second physical interface to correspond to the virtual interface, and wherein the packet forwarding engine forwards the traffic via the second physical interface by selecting backup pointers within the indirect next hop data.

* * * * *

UNITED STATES PATENT AND TRADEMARK OFFICE
CERTIFICATE OF CORRECTION

| | |
|---|---|
| PATENT NO. | : 7,447,149 B1 |
| APPLICATION NO. | : 10/952457 |
| DATED | : November 4, 2008 |
| INVENTOR(S) | : Beesley et al. |

It is certified that error appears in the above-identified patent and that said Letters Patent is hereby corrected as shown below:

Column 16, line 14 (Claim 22), "napping." should read -- mapping --

Column 16, line 48 (Claim 26), "hoop" should read -- hop --

Signed and Sealed this

Twenty-sixth Day of October, 2010

David J. Kappos
*Director of the United States Patent and Trademark Office*